(12) United States Patent
Schmidtler

(10) Patent No.: US 9,282,117 B2
(45) Date of Patent: Mar. 8, 2016

(54) SYSTEM AND METHOD TO PROVIDE AUTOMATIC CLASSIFICATION OF PHISHING SITES

(71) Applicant: Webroot Inc., Broomfield, CO (US)

(72) Inventor: Mauritius A. R. Schmidtler, Escondido, CA (US)

(73) Assignee: Webroot Inc., Broomfield, CO (US)

( * ) Notice: Subject to any disclaimer, the term of this patent is extended or adjusted under 35 U.S.C. 154(b) by 0 days.

(21) Appl. No.: 13/949,974

(22) Filed: Jul. 24, 2013

(65) Prior Publication Data

US 2014/0033307 A1     Jan. 30, 2014

Related U.S. Application Data

(60) Provisional application No. 61/675,220, filed on Jul. 24, 2012.

(51) Int. Cl.
*H04L 29/06* (2006.01)
*G06F 21/56* (2013.01)
*G06F 21/57* (2013.01)

(52) U.S. Cl.
CPC ............ *H04L 63/1483* (2013.01); *G06F 21/56* (2013.01); *G06F 21/577* (2013.01)

(58) Field of Classification Search
CPC ............ H04L 63/1416; H04L 63/1408; H04L 63/145; H04L 63/1441; H04L 63/1458
USPC .......................................................... 726/22
See application file for complete search history.

(56) References Cited

U.S. PATENT DOCUMENTS

| | | | | |
|---|---|---|---|---|
| 8,505,094 B1* | 8/2013 | Xuewen | ............... | H04L 63/1416 707/687 |
| 8,769,685 B1* | 7/2014 | Conrad | .................. | G06F 21/562 726/23 |
| 8,843,820 B1* | 9/2014 | Kay | ......................... | G06F 17/30 715/234 |
| 2009/0119182 A1* | 5/2009 | Krstulich | ................. | G06F 21/42 705/26.1 |
| 2010/0186088 A1* | 7/2010 | Banerjee | .................. | G06F 21/51 726/23 |
| 2011/0185423 A1* | 7/2011 | Sallam | ................... | G06F 21/552 726/23 |
| 2011/0239294 A1* | 9/2011 | Kim | ....................... | G06F 21/566 726/22 |
| 2012/0110121 A1* | 5/2012 | Flitcroft | ............ | G06F 17/30899 709/217 |
| 2012/0144481 A1* | 6/2012 | Manianchira | ....... | H04L 63/1441 726/22 |
| 2012/0174224 A1* | 7/2012 | Thomas | ................ | G06F 21/566 726/24 |
| 2013/0055394 A1* | 2/2013 | Beresnevichiene | ... | G06F 21/577 726/24 |

OTHER PUBLICATIONS

Shahriar et al., "Information Source-based Classification of Automatic Phishing Website Detectors", 2011.*
Cisco, "IronPort Web Reputation Filters," IronPort S-Series, 4 pages, printed in year 2012.*
International Search Report and Written Opinion for International (PCT) Patent Application No. PCT/US2013/051821, mailed Nov. 21, 2013 9 pages.
"International Preliminary Report on Patentability Issued in PCT Application No. PCT/US2013/051821", Mailed Date: Jan. 27, 2015, 6 Pages.

* cited by examiner

*Primary Examiner* — Yonas Bayou
(74) *Attorney, Agent, or Firm* — Merchant & Gould, P.C.

(57) ABSTRACT

A phishing classification model that detects a phishing website based on one or more feature vectors for the website is provided. The phishing classification model may operate on a server and may further select a website, generate a feature vector for a landing page of the website, create a feature vector for every iframe that is a descendent of the landing page, and derive a final feature vector from the feature vectors of the landing page and the descendent iframe pages. Further, machine learning techniques may be applied to generate, or train, a classification model based upon one or more known phishing websites. Based on the feature vector, the classification modeler may classify a website as either a phishing website or as a non-phishing website. Feedback in the form of human verification may further be incorporated.

20 Claims, 11 Drawing Sheets

SYSTEM AND METHOD TO PROVIDE AUTOMATIC CLASSIFICATION OF PHISHING SITES

CROSS REFERENCE TO RELATED APPLICATION

The present application claims priority to U.S. Provisional Patent Application No. 61/675,220, filed on Jul. 24, 2012, the entire contents of which is hereby incorporated by reference for all that it teaches and for all purposes.

FIELD OF THE INVENTION

The invention comprises an automatic classification system that identifies phishing sites. The system utilizes Machine Learning techniques to automate the learning of the classification system.

BACKGROUND

With the increasing utilization of computer based devices and systems like desktops, smart-phones, tablets, smart televisions, networks, and the internet for personal as well as commercial use as well as the continuing growth of the world-wide-web (IPv6) comes a proliferation of threats that jeopardize the secure usage of these devices and systems. For example, users of network enabled computer based devices like desktops, laptops, smart-phones, tablets, and smart-televisions are exposed to a variety of risks like financial fraud, loss of privacy, loss of critical information, as well as other threats generated by malicious software. These threats are constantly evolving and changing to avoid detection. At the same time as these threats change and evolve, threat research generally monitors and analyzes new software applications and network activities to defend against these threats. A specific type of threat to these systems are sites, that without permission, alleges to act on behalf of a third party with the intention of confusing viewers into performing an action with which the viewer would only trust a true agent of the third party, also known as phishing.

The uptime of phishing sites is relatively short. For example the median uptime for phishing sites in the year 2010 as determined by APWG was around 12 hours. Every day phishing sites are detected and taken offline. At the same time new phishing sites are brought online. This on-going competition between the creators of phishing sites and the people that combat phishing results in a continuous adaptation in the design and setup of phishing sites. The challenge in the fight against phishing is to keep up with the changing phishing strategies while maintaining a high detection rate at a low cost. Both, detection rate and the costs associated with the detection are important factors in keeping the financial incentive for creating phishing sites below some threshold and, thus, in controlling the extent of phishing. In order to handle the ever evolving phishing technology efficiently and economically a detection system is needed that is capable to adapt to a large extent automatically and with a short lag time to the changing environment.

The automatic adaptation of known phishing detection systems is limited by the information utilized and the preprocessing applied to the utilized information. In particular, current detection systems utilize a predefined and constant subset of the available information thus limiting the systems' capabilities to adapt to changes not contained in the subset. In addition, current systems preprocess the utilized information. The preprocessing is based on some understanding or prior knowledge how phishing sites work currently. For example, domain names of phishing sites tend to contain more forward slashes than non-phishing sites. Current detection systems utilize this prior knowledge by counting the number of forward slashes in the domain name and using this count as a feature. Most likely, phishing sites will adapt over time rendering the number of forward slashes in the domain name useless in signaling a phishing site.

SUMMARY

It is with respect to the above issues and other problems that the embodiments presented herein were contemplated. In accordance with some embodiments of the present disclosure, a phishing classification system, or model, is disclosed that provides improved protection compared to the current state of the art against threats to internet security and against malicious code in general. The improvement is achieved by leveraging nearly all of the relevant information and encoding this information with as little preprocessing as possible. This results in a highly adaptive system capable of capturing evolving or new signal patterns without changing or updating the sources as well as the encoding of the input information supplied to the system. By constantly retraining this highly adaptive system on newly detected phishing sites, one automatically maintains the system's capability of detecting new phishing sites despite continuously changing practices and strategies used in phishing.

For example, a web-page generally comprises a landing page, i.e. the page that is rendered given a specific URL. The landing page may contain iframes which by themselves are web-pages. The content of the iframes may be displayed as an overlay to the landing page. An iframe itself may contain other iframes. This results in a tree-like structure of web-pages with the landing page at the root of the tree and the iframes as its descendants. In addition to iframes, web-pages may also contain other dynamic content through, e.g., javascripts. The phishing classification system utilizes, to a large degree, all the information that is contained or can be derived from a web page. Alternatively, or in addition, the phishing classification system utilizes less than all of the information that is contained or can be derived from a webpage.

In accordance with embodiments of the present disclosure, the phishing classification system encodes this information by creating a feature vector for one or more pages of the web page, i.e. the landing page and its descendant iframe pages. In some embodiments, a feature vector is created for every page of the web page. A final feature vector $\vec{p}$ may then be derived from the individual page feature vectors according to the following formula:

$$\vec{p} = \begin{pmatrix} \vec{p}_{00}, \frac{1}{n_1}\sum_{k}^{n_1} \vec{p}_{1k}, \frac{1}{n_{11}}\sum_{\{k|k \in bin_{11}\}}^{n_{11}} \vec{p}_{1k}, \ldots, \frac{1}{n_{1m}}\sum_{\{k|k \in bin_{1m}\}}^{n_{1m}} \vec{p}_{1k}, \\ \vdots \\ , \frac{1}{n_l}\sum_{k}^{n_l} \vec{p}_{lk}, \frac{1}{n_{l1}}\sum_{\{k|k \in bin_{l1}\}}^{n_{l1}} \vec{p}_{lk}, \ldots, \frac{1}{n_{lm}}\sum_{\{k|k \in bin_{lm}\}}^{n_{lm}} \vec{p}_{lk} \end{pmatrix}$$

where $\vec{p}_{lk}$ denotes the page feature vector of the k-th page at the l-th level in the tree (see e.g. FIG. 3) and n denotes the number of entries in a specific bin. The bins may be defined in relation of a page to its parent. For example one relation may measure the similarity between a pair of pages based on the pages' URL strings. In this instance, a bin contains the average page feature vectors of the children pages that have similar URL strings in relation to their parent within the resolution of the bin width. This procedure allows the system to capture the overall structure of the web page with the relationship of the individual pages to each other.

The page feature vectors themselves may be constructed by concatenating one or more of the following individual feature vectors: (a) a URL feature vector comprising at least one of (i) character n-grams of a URL string, (ii) character n-gram of a corresponding IP address, and (iii) geo-location information of a URL including, but not limited to, country, region, city and ISP vendor; (b) an average URL feature vector derived from one or more links and/or one or more href tags on a page; (c) an average URL feature vector derived from links and href tags on a page in bins of similarity to the page URL feature vector; (d) an HTML content feature vector, including but not limited to, (i) bag of word model of input tag fields; (ii) bag of word model of form tag fields; (iii) bag of word model of input tags within form tags; (iv) bag of word model for action fields; and (v) bag of word model of whole text content of a page; (e) a feature vector based on proprietary content classification results; and (f) a feature vector based on an age of web page. The relations of a page to its parent page used in defining the bins in the final feature vector $\vec{p}$ may be based on these individual feature vectors.

The feature vector as described above yields a high-dimensional and sparse feature space. A data corpus of approximately $2 \cdot 10^6$ examples results in a feature space with around $10^7$ dimensions. Given the sparsity and high-dimensionality of the problem, embodiments of the present disclosure utilize the good generalization properties of large margin classifiers like Support Vector Machines (SVM) or Maximum Entropy Discrimination (MED) to train a binary classifier for detecting phishing sites. Training an MED classifier on a sample of around $2 \cdot 10^4$ phishing sites and $6 \cdot 10^5$ non-phishing sites yields on an independent test set the Receiver Operating Characteristic (ROC) curve a shown in FIG. 12. The false positive and true positive rates of the learned MED classifier compare well to other published results. For example, the MED phishing classifier, as described above, may achieve higher true positive rates compared to the results obtained by C. Whittaker et al. and G. Xian et al. at comparable false positive rates. Of course, as can be appreciated by those skilled in the art, the false positive rate and the true positive rate may vary from that which is illustrated in FIG. 12.

As will be described below, a process of continuously retraining the phishing classifier by crawling newly detected phishing sites, websites contained in a proprietary database, and online payment/shopping/banking websites based on an external list supplied by customers and/or partners may be performed. The process of continuously retraining together with the plasticity of the employed feature space ensures the automatic adaptation of the phishing classifier to new phishing patterns. In some embodiments, a continuous retraining process utilizes Active Learning to further optimize the retraining process. Alternatively, or in addition, transductive learning is employed in the continuous retraining process.

In accordance with some embodiments of the present disclosure, the automatic phishing classification system may be language independent. For example, instead of being made specific to western languages, characters utilized to generate feature vectors may be represented in a hexadecimal representation and further used with an associated n-gram representation of the sequence of characters. By employing techniques that make threat detection invariant to language, such techniques can be widespread, increase a the information available for detection, and increase a rate of detection.

According to some embodiments of the present invention, a method is provided, the method creating a feature vector for a website, and providing the feature vector to a model to determine whether or not the website is a phishing website.

And further yet, a system for classifying one or more websites is provided, the system comprising a plurality of sensors for providing input data to a server configured to create a feature vector for a website and provide the feature vector to a model to determine whether or not the website is a phishing website.

And further yet, a non-transitory computer readable medium is provide, the non-transitory computer readable containing instructions that when executed by a processor and memory, cause the processor to facilitate the classification of one or more websites, the instructions comprising: creating a feature vector for a website, and providing the feature vector to a model to determine whether or not the website is a phishing website.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A. B, and/or C" means A alone, B alone, C alone. A and B together. A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material". In some instances, Human input may be performed for a portion of the process, such as in a feedback look, without rendering the process non-automatic. For example, a process may operate automatically in accordance with one or more operating parameters while still receiving one or more forms of human verification.

The term "exemplary" is used herein to mean "serving as an example, instance, or illustration." Any implementation described herein as "exemplary" is not necessarily to be construed as preferred or advantageous over other implementations.

The term "computer-readable medium" as used herein refers to any tangible storage that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH- EPROM, a solid state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, the invention is considered to include a tangible storage medium and prior art-recognized equivalents and successor media, in which the software implementations of the present invention are stored.

The terms "determine", "calculate", and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the invention is described in terms of exemplary embodiments, it should be appreciated that individual aspects of the invention can be separately claimed. As will become apparent in view of the following disclosure, the various aspects and embodiments of the invention can be combined.

DETAILED DESCRIPTION

The ensuing description provides embodiments only, and is not intended to limit the scope, applicability, or configuration of the claims. Rather, the ensuing description will provide those skilled in the art with an enabling description for implementing the embodiments. It being understood that various changes may be made in the function and arrangement of elements without departing from the spirit and scope of the appended claims.

Figure 1:
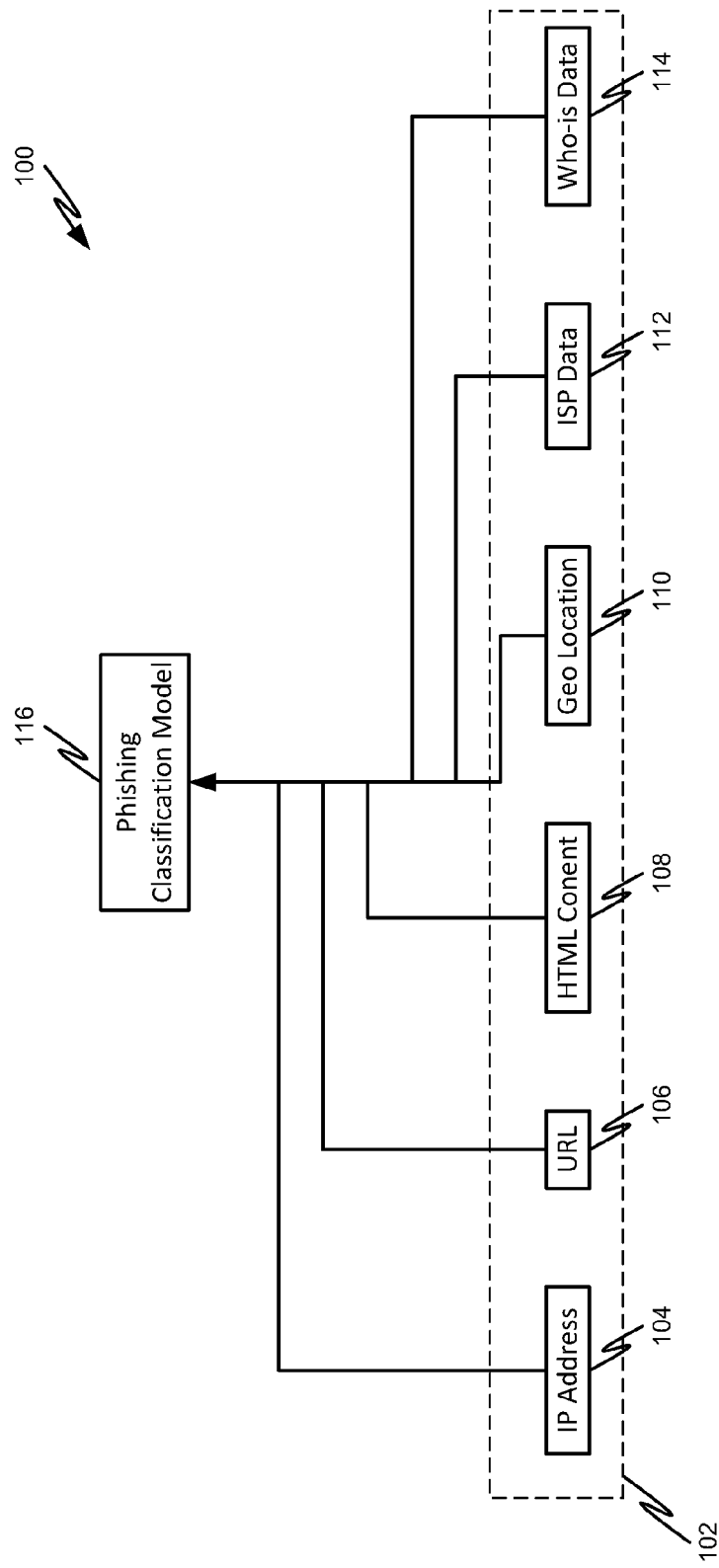
FIG. 1 depicts a representation of a phishing classification model in accordance with some embodiments of the present disclosure.

Referring initially to FIG. 1, details of a phishing classification system 100 are depicted in accordance with at least some embodiments of the present disclosure. A phishing classification model 116 of the phishing classification system 100 generally derives an overall, or holistic, assessment for a particular webpage and/or website to be classified. A classification of each webpage and/or website, and/or an instance of a webpage and/or website, may be based on, or otherwise depend on, one or more inputs 102.

For example, input 102 may include, but is not limited to, one or more IP addresses 104, one or more uniform resource locators (URLs) 106, HTML content 108, geo-location information 110, Internet Service Provider (ISP) data 112, and who-is data 114. Each input 102 may be presented as a feature vector based on raw input data. Alternatively, or in addition, one or more input 102 may be raw input data. As previously described, not all inputs are required to generate a phishing classification score. In fact, in some instances, some information provided by one or more input 102 may not be available; thus a phishing classification score may be based on a subset of input 102, or those inputs 102 that are available at a particular point time—also referred to as incomplete data. Accordingly, when an input 102 becomes available and is generally used in the phishing classification model 116, a phishing classification score may be updated based on the newly available input 102.

Figure 2:
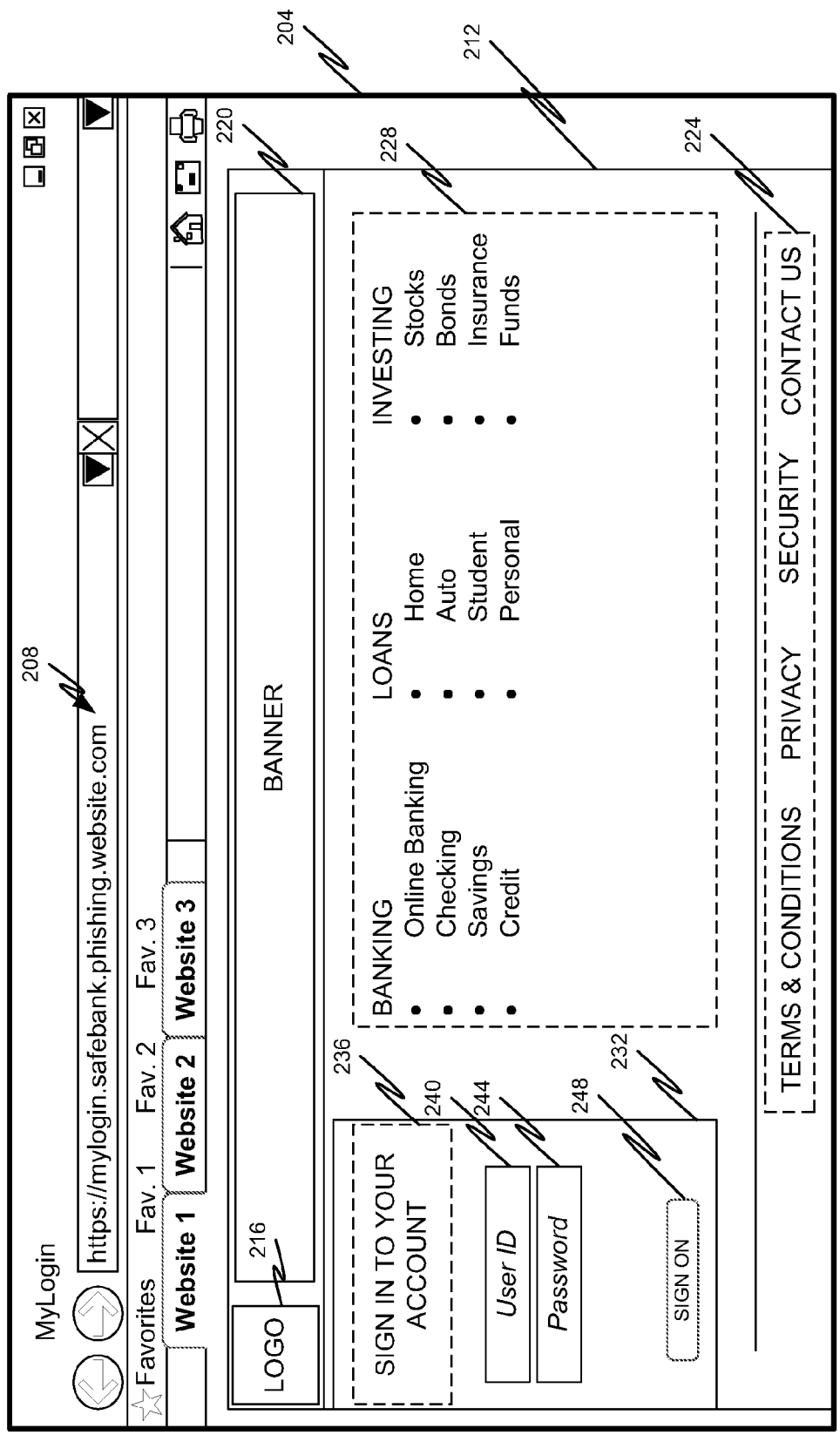
FIG. 2 depicts an example of a webpage in a web browser in accordance with some embodiments of the present disclosure.

Referring to FIG. 2, an example web browser 204 and webpage 212 is illustrated. Web browser 204 may be any web browser capable of retrieving and displaying information resources that reside on the world wide web. Example web browsers 204 include, but are not limited to Internet Explorer, Chrome, Firefox, Opera, and Safari. Web browser 204 generally includes an address bar 208 that displays a particular Uniform Resource Locator (URL) 208 in which a web browser 204 is currently accessing. A URL may refer to a remote server providing access to one or more resources, such as, but not limited to web pages, websites, documents, and discussions. Alternatively, or in addition, a URL may refer to a local resource located on a local computer system.

The web browser 204 may display one or more web pages 212 to a user. A webpage 212 is generally a web document or other resource that is accessible through a web browser and displayed on a monitor or mobile device. The webpage 212 may be rendered, or displayed, within the borders of the web browser 204, or may be displayed as a separate application or resource. For example, it is not uncommon for a web page to launch a pop-up window capable of displaying one or more resources, such as audio video, in a separate window or web browser.

The webpage 212 may be rendered according to a document object model (DOM) that is associated with the webpage. The DOM may include one or more nodes that correspond to one or more elements appearing in the webpage. For example, webpage 212, as shown, is generally illustrative of a banking website requiring the submission of sensitive information to gain access to services provided by a banking institution. The example webpage 212 may include elements such as, but not limited to one or more logos 216, a banner or banners 220, 224, one or more content areas 228, and one or more login areas 232. The login area 232 generally includes one or more fields or forms 240, 244 and a "submit"

and/or "sign on" button 248. A login area 232 may include a content area 236; the content area 236 may include instructions that a user is to follow to gain access to services provided by the banking institution. Alternatively, or in addition, content area 236 may include content generally representative of the login area 232. For example, content area 236 provides an indication to a user that content area 236 is a location in which a user id and password are entered. For instance, a user would enter a user id in field 240 and a password in field 244. After entering these two items, a user would click on the "sign on" button 248 to be logged into the banking website. Once logged in, the user may have access to various services and offerings provided by the banking institution. Each element, as described above, may have one or more DOM nodes associated therewith.

The webpage 212 may be created, or coded, using various mark-up and programming languages such as, but not limited to HTML, XML, JAVASCRIPT, AJAX, ASP, PHP, Perl, Python, .NET, Java, and jQuery. In general, a webpage, such as webpage 212, resides on a server capable of serving web content. More specifically, a web page 212 may include programming code that causes web content and/or functions to be transferred and displayed to a user at a client or computer system. Upon a user navigating the web browser 204 to a particular webpage or resource residing on a web server 204 for example, content 228 related to the webpage 212 is transmitted to the web browser 204 for rendering and display in the webpage 212.

Various mark-up and programming languages make actions, functions, and/or interactions of the webpage possible. For example, some programming languages execute programming code on the web server in which they reside; such programming languages are often referred to as server side coding languages or server side scripting languages. An example of a server side language is PHP. Other programming languages are designed to execute on the client computer system, such as within the web browser 204 and/or on the client computer system and/or computing device; these programming languages are often referred to as client side coding languages or client side scripting. An example of a client side scripting language is JavaScript. Depending on requirements, a webpage 212 may be coded in multiple programming languages, wherein coded portions of a web page 212 are executed at a web server while other coded portions of a web page are executed on the client computer system.

Moreover, web pages utilize various programming techniques to provide one or more users with added functionality. For example, in addition to javascript, images, tags etc. . . . a web page may utilize one or more iframes which are themselves web pages. The content of the iframe tends to contain other iframes and is generally displayed as an overlay on the landing page (i.e. 212). For example, a phishing website, such as phishing site referenced by URL 208, may contain one or more logos 216, banners 220, 224, and login areas 232; each of these areas may themselves be presented as an iframe. Moreover, each iframe may include information, such as content rendered according to a DOM.

In some situations, a web browser 204 may be directed, and/or redirected, to a phishing website, such as the phishing website illustrated by the URL 208. As previously discussed, a phishing site generally resembles a site familiar to a user such that a user is "tricked" into believing that the site is generated by a trusted provider. For example, the web page 212 may be generated to look similar to a banking website that a user generally uses. That is, a landing page, such as the first page displayed to a client (i.e. 212), may look and feel like a trusted landing page, but in reality, is actually one or more web pages associated with a phishing site that is attempting to glean and/or steal information from an unsuspecting user. For example, information from the content area 236, login area 232, and or content area 228 may be presented to a user as an iframe, where the iframe references one or more malicious sites, such as a phishing site. An unsuspecting user may be tempted to enter information into a login area 232 because the web page 212 looks like a trusted web page they are used to seeing.

Figure 3:
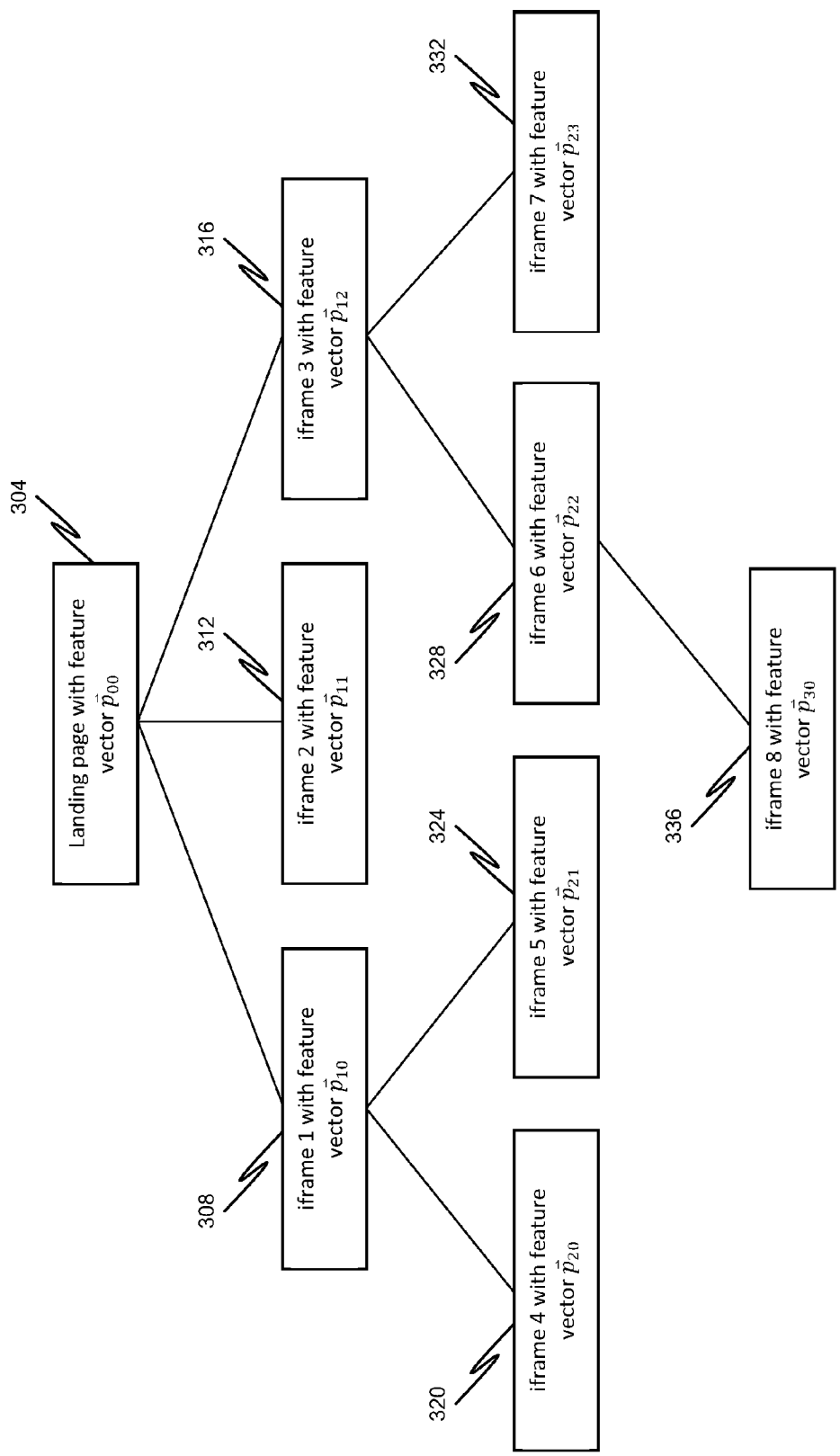
FIG. 3 depicts a tree-like structure of a landing page and one or more iframes in accordance with some embodiments of the present disclosure.

In accordance with embodiments of the present disclosure, a feature vector may be created for each and every page of a web page 212. Feature vectors may be created by utilizing input 102 corresponding to one or more IP addresses 104, one or more uniform resource locators (URLs) 106, HTML content 108, geo-location information 110, ISP data 112, and who-is data 114. For example, FIG. 3 illustrates schematically a tree-structure of an example web-page, for example web page 212, having corresponding feature vectors. As one example, a feature vector may be created for the main landing page 304; the feature vector may correspond to $\vec{p}_{00}$, where 00 indicates that the web page is a landing page. As another example, a feature vector $\vec{p}_{10}$ may be generated for an iframe 308 of a landing page 304; that is, a feature vector may be created for each iframe (i.e. 308, 312, 316, 320, 324, 328, 332, 336) in a web page. As another example, a feature vector $\vec{p}_{30}$ may be created for an iframe 8 336 depending on iframe 6 328, which depends on iframe 3 316 depending from the main landing page 304.

Utilizing each feature vector corresponding to a landing page 304 and one or more iframes, a final feature vector, $\vec{p}$ may be derived from the individual page feature vectors. For example, the final feature vector $\vec{p}$ may be derived according to the following formula:

$$\vec{p} = \begin{pmatrix} \vec{p}_{00}, \frac{1}{n_1}\sum_{k}^{n_1} \vec{p}_{1k}, \frac{1}{n_{11}}\sum_{\{k|k \in bin_{11}\}}^{n_{11}} \vec{p}_{1k}, \dots, \frac{1}{n_{1m}}\sum_{\{k|k \in bin_{1m}\}}^{n_{1m}} \vec{p}_{1k}, \\ \vdots \\ , \frac{1}{n_l}\sum_{k}^{n_l} \vec{p}_{lk}, \frac{1}{n_{l1}}\sum_{\{k|k \in bin_{l1}\}}^{n_{l1}} \vec{p}_{lk}, \dots, \frac{1}{n_{lm}}\sum_{\{k|k \in bin_{lm}\}}^{n_{lm}} \vec{p}_{lk} \end{pmatrix}$$

where $\vec{p}_{1k}$ denotes the page feature vector of the k-th page at the 1-th level in the tree (see e.g. FIG. 3) and n denotes the number of entries in a specific bin. For example, in accordance with some embodiments of the present disclosure, one relation used measures the similarity between a pair of pages based on the page's URL string. In this instance, a bin contains the average feature page vectors of the children pages that have similar URL strings in relation to their parent within the resolution of the bin width. By defining a feature vector in this manner, the final feature vector can capture the overall structure of the web page with the relationship of the individual pages to each other. As another example, other relations used may be, but are not limited to, relations used to measure the similarity between a pair of pages based on the page's IP address, relations used to measure the similarity between a pair of pages based on the page's DOM attributes, relations used to measure the similarity between a pair of pages based on the page's DOM Elements, relations used to measure the similarity between a pair of pages based on the page's text.

Alternatively, or in addition, the page feature vectors themselves may be constructed by concatenating one or more of the following individual feature vectors: (a) a URL feature vector comprising at least one of (i) character n-grams of a URL string, (ii) character n-gram of a corresponding IP address, and (iii) geo-location information of a URL including, but not limited to, country, region, city and ISP vendor; (b) an average URL feature vector derived from one or more links and/or one or more href tags on a page; (c) an average URL feature vector derived from links and href tags on a page in bins of similarity to the page URL feature vector; (d) an HTML content feature vector, including but not limited to, (i) bag of word model of input tag fields; (ii) bag of word model of form tag fields; (iii) bag of word model of input tags within form tags; (iv) bag of word model for action fields; and (v) bag of word model of whole text content of a page; (e) a feature vector based on proprietary content classification results; and (f) a feature vector based on an age of web page. The relations of a page to its parent page used in defining the bins in the final feature vector $\vec{p}$ may be based on these individual feature vectors.

Importantly, by defining feature vectors in the manner previously described, the phishing classification system can avoid having to preprocess information according to a prior understanding or prior knowledge of how phishing sites work. That is, all relevant information is utilized while limiting the amount of preprocessing that is required. Thus, by constantly retraining a highly adaptive system on newly detected phishing sites, one automatically maintains the system's capability of detecting new phishing sites despite continuously changing practices and strategies used in phishing.

The feature vector as described above yields a high-dimensional and sparse feature space. A data corpus of approximately $2 \cdot 10^6$ examples results in a feature space with around $10^7$ dimensions. Given the sparsity and high-dimensionality of the problem, embodiments of the present disclosure utilize the good generalization properties of large margin classifiers like Support Vector Machines (SVM) or Maximum Entropy Discrimination (MED) to train a classifier for detecting phishing sites; such a classifier may be a binary classifier.

Figure 4:
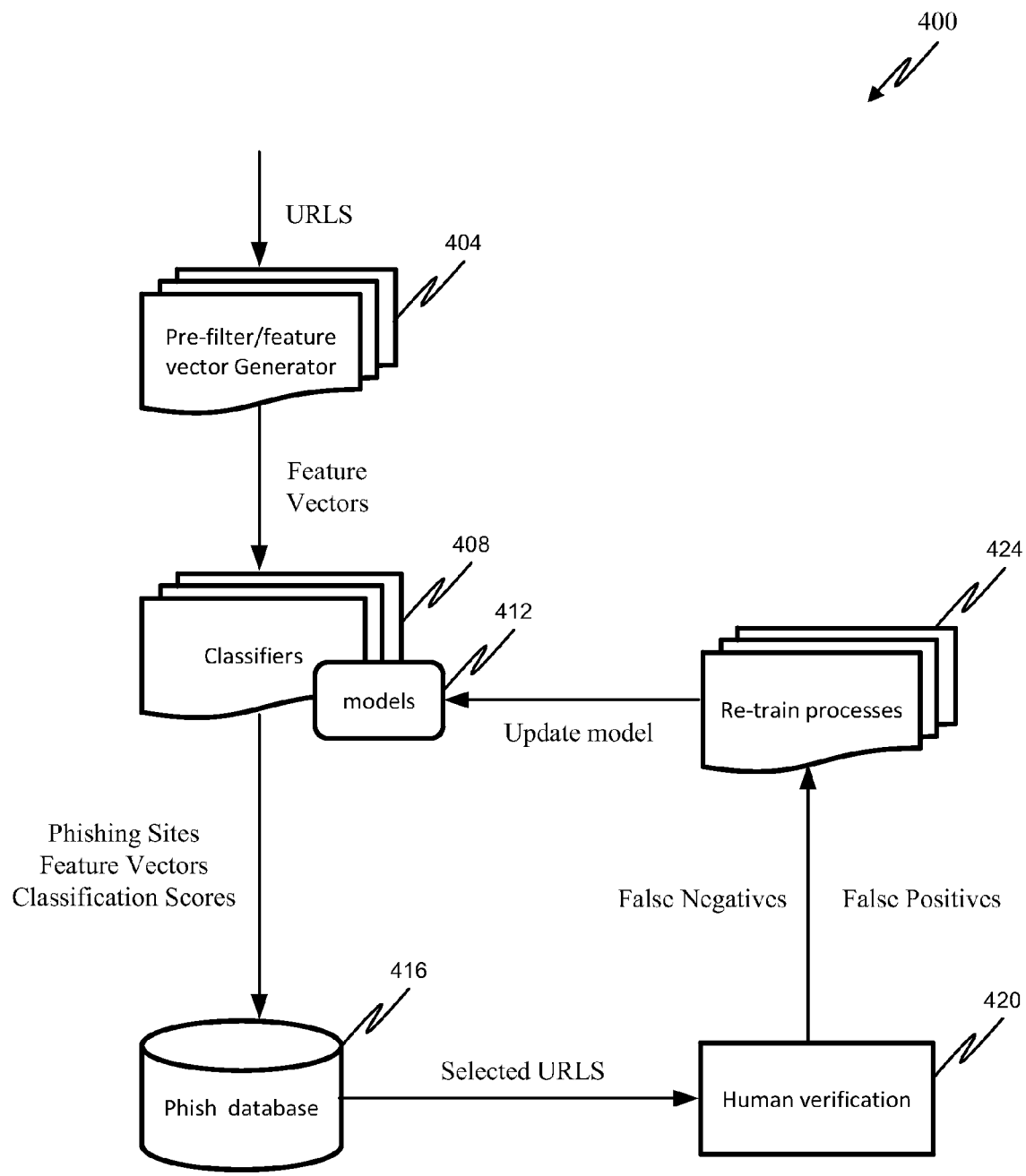
FIG. 4 depicts an example embodiment of a phishing classification system in accordance with some embodiments of the present disclosure.

In accordance with embodiments of the present disclosure, FIG. 4 illustrates one or more components and/or processes of the phishing classification model 116 involved in generating feature vectors and detecting phishing sites. For example, one or more URLs may be received at a pre-filter/feature vector generator 404. The URLs may correspond to known phishing sites as well as unknown fishing sites. As one example, the URLs may be provided by one or more third party systems. The feature vectors produced by the feature vector generator 404 are passed to one or more classifiers 408 for classification. For example, a classification model 420 for detecting phishing websites may be used to determine if the passed feature vectors appear to be associated with one or more phishing websites. As one example, the one or more classifiers 408, relying on one or more models 412, may determine a probability that a webpage associated with one or more URLs is a phishing site. This determined probability is generally normalized resulting in a classification score for the one or more URLs, where the classification score generally represents a measure of the likelihood that the URL is or otherwise is associated with a phishing site. The classification score may be compared to a threshold; if the classification score is above a threshold, the website may be a phishing website. Likewise, and based on the model, if the classification score is below a threshold, the website may be a phishing website. Alternatively, or in addition, a score may be generated that may be used to identify one or more targets of the phishing site; that is, the target may be the website and/or webpage that is being impersonated by the phishing website. The score may provide a probability used to identify an entity of which the phishing site is targeting. As one example, a score may be provided that is indicative of whether or not the phishing site targets a category of entities, for example banking institutions. Additionally, a score may be provided that is indicative of whether or not the phishing site targets a specific entity or specific company. Accordingly, the feature vectors for the webpage and/or web-site, and the classification score may be stored in a Phish database 416.

In accordance with some embodiments of the present disclosure, Active Learning may be employed such that the one or more models 412 utilized by the classifiers 408 are trained using labeled data. For example, one or more URLs associated with a website may be passed to 420 for human verification such that one or as more researches may determine and correctly label a URL as a phishing website or a non-phishing website. In some instances, the URLs passed are selected at random, in other instances, the URLs that are passed may be flagged based on a classification score and/or a because of a particular feature in a feature vector is present. As the researchers work through the review priority lists and assign new threat assessments, the phishing classification model 116 may update the phishing model 412, the phishing classification scores for all instances, and the review priority lists. The updates may be processed by a distributed highly scalable system to ensure that any updates are available to the researchers within seconds to their provided input. As one example, at 420, the site associated with the URL may be verified such that sites associated with false positives and/or false negatives may be utilized to retrain one or more classifiers and/or models 412 at 424 such that the model is updated. An updated model may then be provided as a retrained classification model 412; the retrained classification model 412 may be a binary classification model.

In some embodiments, the labels used depend on a particular model 412 that is being utilize. For example, one model 412 may be utilized to determine whether or not a website is a phishing website, while a second model 412 may be utilized to determine whether or not the determined phishing website targets a specific entity, as previously described. Thus, the labels for one model may be different than the labels for another model.

In some embodiments, the feature vectors may be provided to retrain one or models 412. Retraining may include one or more learners, where the learner may be passive, active, and/or transductive learners, and may further be based upon Support Vector Machines (SVM), Maximum Entropy Discrimination (MED), Boosted Decision Trees, Feed Forward Neural Networks (FFN), and Deep Believe Networks (DBN). The system may utilize passive learning as well as Active Learning. For example, the phishing classification model may include a set of classifiers, regressors, and density estimators that are trained leveraging supervised as well as unsupervised Machine Learning technologies and are combined into a single model 412 through, e.g., voting, stacking, multi linear regression or multi response model trees. Using the combined model the phishing classification scores of all instances are generated and, given the assessment, instances are automatically classified at the one or more classifiers 408. For each instance that has not been assigned at threat assessment by a researcher (label), i.e. every instance that is not included in the supervised training of the various estimators, the system may estimate the importance of these examples to be included in the supervised training process to further improve the phishing model 412. The determined estimates may then be utilized to maintain a review priority list for the researcher and are used to reduce the label complexity. As the researcher work through one or more review priority lists and assign new threat assessment, the system may update the phishing model 412, the phishing classification scores for all instances, and the review priority lists. The updates may be processed by a distributed highly scalable system to ensure that any updates are available to the researchers within seconds to their provided input.

Figure 5:
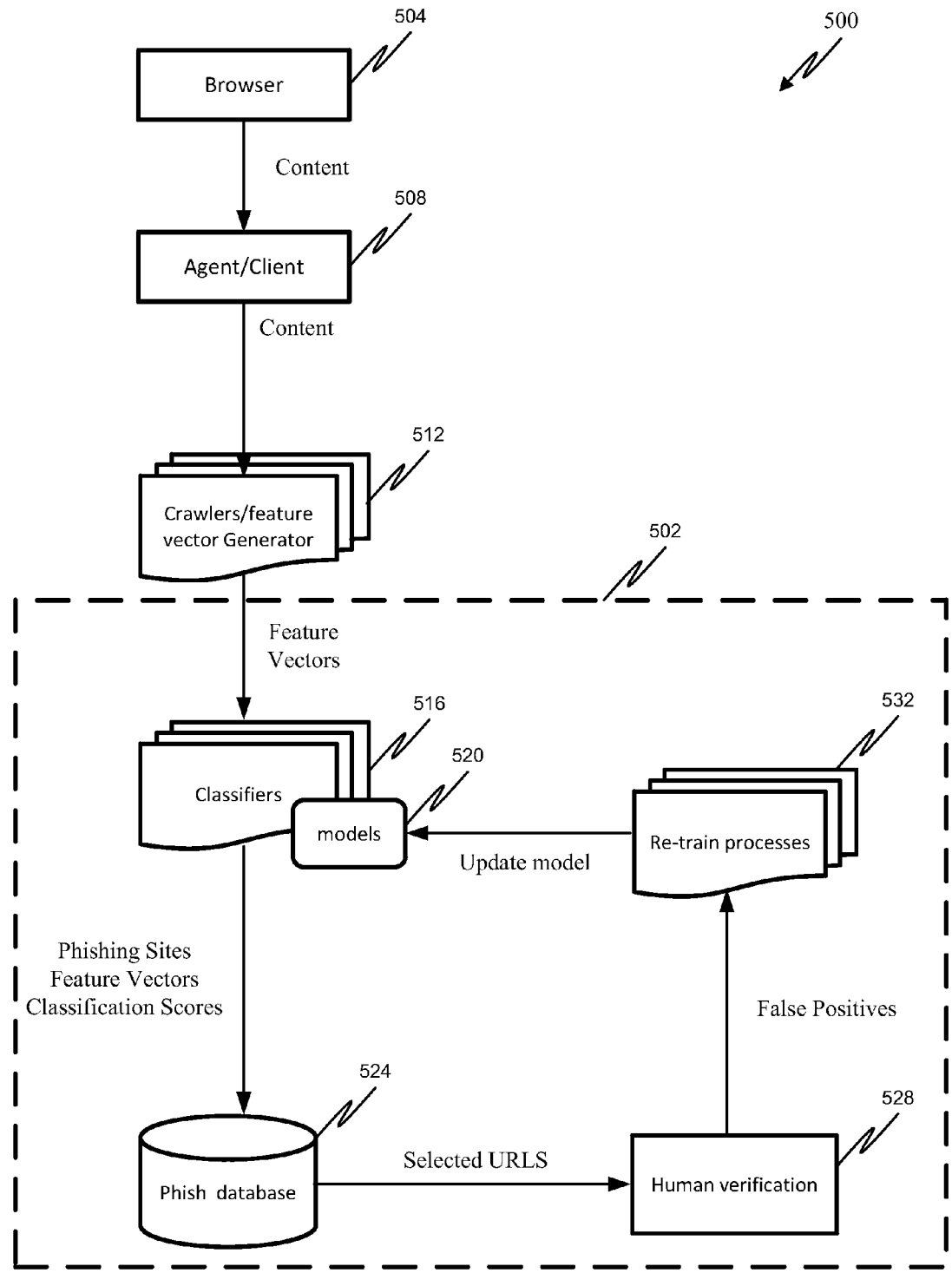
FIG. 5 depicts a second example embodiment of a phishing classification system in accordance with some embodiments of the present disclosure.

In accordance with embodiments of the present disclosure, FIG. 5 illustrates one or more components and/or processes of the phishing classification model 116 in accordance with at least one embodiment of the present disclosure for generating feature vectors and detecting phishing sites. For example, a browser may browse certain content at 504 associated with one or more URLs. As one example, the content may include a URL, HTML content, an IP address, and/or the like. An agent/client 508 residing on a system associated with the browser, may generate one or more feature vectors at crawler/feature vector generator 512 based on the content and pass the one or more feature vectors to a classification process residing in a cloud 502. For example, a phishing model 520 for detecting phishing websites may be used at the classifier 516 to determine if the passed feature vectors appear to be associated with one or more phishing website; the phishing model 520 may be a binary classification model. Alternatively, or in addition, a score may be generated that may be used to identify one or more targets of the phishing site; that is, the target may be the website and/or webpage that is being impersonated by the phishing website. The score may provide a probability used to identify an entity of which the phishing site is targeting. As one example, a score may be provided that is indicative of whether or not the phishing site targets a category of entities, for example banking institutions. Additionally, a score may provided that is indicative of whether or not the phishing site targets a specific entity or specific company. Once classified, URL, and the feature vectors for the webpage and/or website, and the classification score may be stored in a Phish database 524.

In accordance with some embodiments of the present disclosure, Active Learning may be employed such that the one or more models utilized by the classifiers 516 are trained using labeled data. For example, one or more URLs associated with a website may be passed to 528 for human verification such that one or more researches may determine and correctly label a URL as a phishing website or a non-phishing website. In some instances, the URLs passed are selected at random, in other instances, the URLs that are passed may be flagged based on a classification score and/or a because of a particular feature in a feature vector is present. As the researchers work through the review priority lists and assign new threat assessments, the phishing classification model 116 may update the phishing model 520, the phishing classification scores for all instances, and the review priority lists. The updates may be processed by a distributed highly scalable system to ensure that any updates are available to the researchers within seconds to their provided input. As one example, at 528, the site associated with the URL may be verified such that sites associated with false positives and/or false negatives may be utilized to retrain one or more classifiers and/or models 520 at 532 such that the model 520 is updated. An updated model 520 may then be provided as a retrained classification model 220; the classification model may be a binary classification model.

In some embodiments, the labels used depend on a particular model 412 that is being utilized. For example, one model 520 may be utilized to determine whether or not a website is a phishing website, while a second model 520 may be utilized to determine whether or not the determined phishing website targets a specific entity, as previously described. Thus, the labels for one model may be different than the labels for another model.

In some embodiments, the feature vectors may be provided to retrain one or models 520. Retraining may include one or more learners, where the learner may be passive, active, and/or transductive learners, and may further be based upon Support Vector Machines (SVM), Maximum Entropy Discrimination (MED), Boosted Decision Trees. Feed Forward Neural Networks (FFN), and Deep Belief Networks (DBN). The system may utilize passive learning as well as Active Learning. For example, the phishing classification model may include a set of classifiers, regressors, and density estimators that are trained leveraging supervised as well as unsupervised Machine Learning technologies and are combined into a single model 520 through, e.g., voting, stacking, multi linear regression or multi response model trees. Using the combined model the phishing classification scores of all instances are generated and, given the assessment, instances are automatically classified at the one or more classifiers 516. For each instance that has not been assigned at threat assessment by a researcher (label), i.e. every instance that is not included in the supervised training of the various estimators, the system may estimate the importance of these examples to be included in the supervised training process to further improve the phishing model 520. The determined estimates may then be utilized to maintain a review priority list for the researcher and are used to reduce the label complexity. As the researcher work through one or more review priority lists and assign new threat assessment, the system may update the phishing model 520, the phishing classification scores for all instances, and the review priority lists. The updates may be processed by a distributed highly scalable system to ensure that any updates are available to the researchers within seconds to their provided input.

Figure 6:
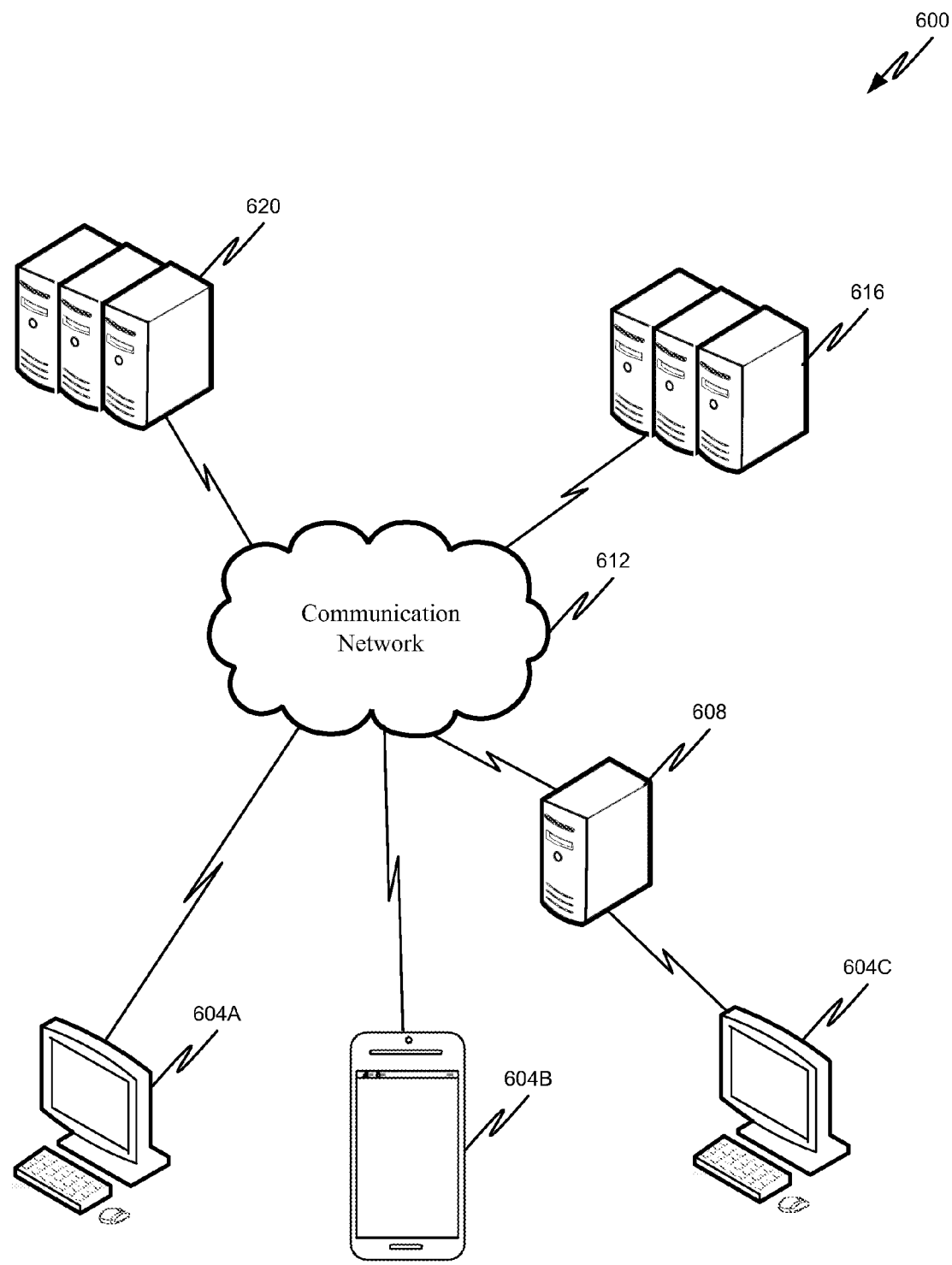
FIG. 6 depicts an example of system in accordance with some embodiment of the present disclosure.

In some embodiments, the phishing classification system 100 may utilize one or more components depicted in FIG. 6. For example, a user may use an endpoint 604 corresponding to anyone of 604A, 604B, 604C to access one or more websites located on a server and accessible via a communication network 612, access one or more files via a communication network 612, and/or receive a communication via a communication network 612. The endpoint 604 may be communication device, such as, but not limited to, a typical computing device 604A, such as a workstation, computer, desktop, laptop and the like. Similarly, endpoint 604 may be a mobile device 604B, such as, but not limited to, a mobile phone and/or Smartphone. Communication network 612 may comprise any type of known communication medium or collection of communication media and may use any type of protocols to transport messages between endpoints. The communication network 612 may include wired and/or wireless communication technologies. The Internet is an example of the communication network 612 that constitutes an Internet Protocol (IP) network consisting of many computers, computing networks, and other communication devices located all over the world, which are connected through many telephone systems and other means. Other examples of the communication network 612 include, without limitation, a standard Plain Old Telephone System (POTS), an Integrated Services Digital Network (ISDN), the Public Switched Telephone Network (PSTN), a Local Area Network (LAN), a Wide Area Network (WAN), a cellular network, and any other type of packet-switched or circuit-switched network known in the art. In addition, it can be appreciated that the communication network 612 need not be limited to any one network type, and instead may be comprised of a number of different networks and/or network types. Further, communication network 612 may also be referred to as the "cloud".

In addition, an endpoint 604C may access communication network 612 using a proxy, such as proxy 608. In accordance with some embodiments of the present invention the phishing classification model 116 may utilize, separately, or in combination, one or more servers/devices 616 accessible to endpoints 604. For example, device 604 may include one or more agents and/or clients operating as an installed program. The one or more agents and/or clients may communicate with the server/device 616, such that the server/device provides one or more of URLs, HTML content, IP address information and the like for use with or by the phishing classification model 116. Further, one or more third party devices/servers 620 may be utilized to provide additional information, such as third party data to the phishing classification model 116 via the communication network 612. The phishing classification model 116 may reside in, or otherwise operate in the server/device 616. Alternatively, or in addition, each endpoint 604 may operate to generate feature vectors and pass the generated feature vectors to the one or more server/devices 612. Alternatively, or in addition, a proxy 608 may operate to generate feature vectors and pass the generated feature vectors to the one or more server/devices 612.

Figure 7:
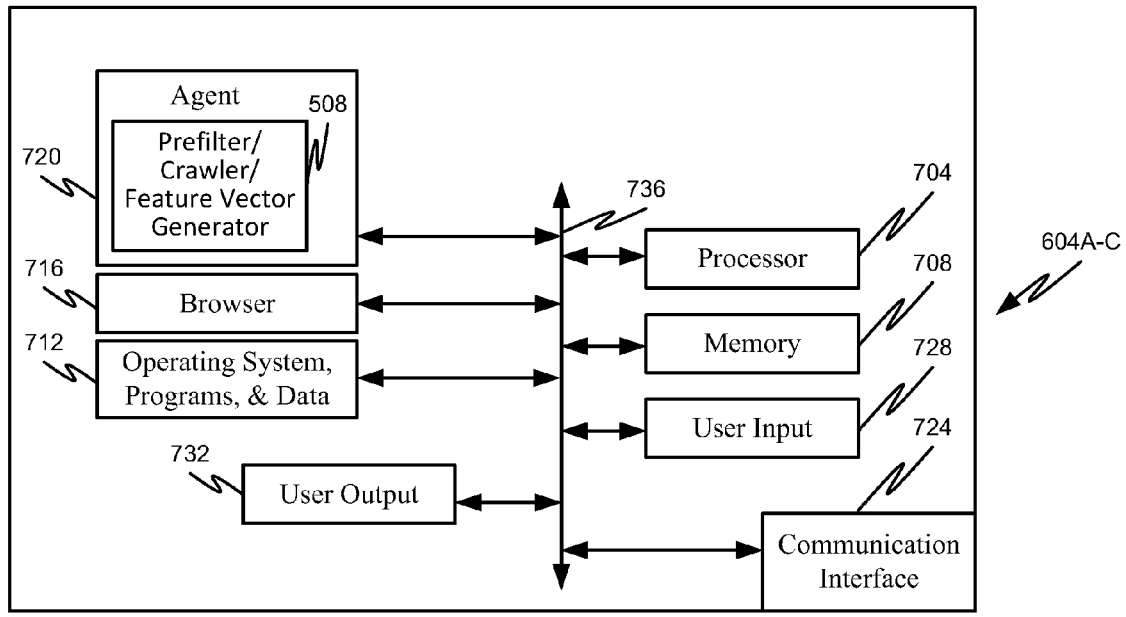
FIG. 7 depicts a block diagram depicting components of an endpoint that are utilized in accordance with embodiments of the present disclosure.

FIG. 7 illustrates a block diagram depicting one or more components of an endpoint 604. The endpoint 604 may include a processor/controller 704 capable of executing program instructions. The processor/controller 704 may include any general purpose programmable processor or controller for executing application programming. Alternatively, or in addition, the processor/controller 704 may comprise an application specific integrated circuit (ASIC). The processor/controller 704 generally functions to execute programming code that implements various functions performed by the endpoint 604 in accordance with at least some embodiments of the present disclosure.

The endpoint 604 may additionally include memory 708. The memory 708 may be used in connection with the execution of programming instructions by the processor/controller 704, and for the temporary or long term storage of data and/or program instructions. For example, the processor/controller 704, in conjunction with the memory 708 of the endpoint 604, may implement one or more operating systems 712, browser 716, agents 720.

The memory 708 of the endpoint 604 may comprise solid state memory that is resident, removable and/or remote in nature, such as DRAM and SDRAM. Moreover, the memory 708 may comprise a plurality of discrete components of different types and/or a plurality of logical partitions. In accordance with still other embodiments, the memory 708 comprises a non-transitory computer readable storage medium. Such a medium may take many forms, including but not limited to, non-volatile media, volatile media, and transmission media.

The memory 708 of the endpoint 604 may further be operable to store configuration logs, captured files, URL data, HTML content, and/or IP address information. Specifically, the endpoint 604 may include one or more communication interfaces 724 for receiving HTML content, application information, data, and/or other information of an electronic kind and/or for communicating with communication network 612. The endpoint 604 may further include user input devices 728 and user output devices 732 to be used in connection with receiving and providing information to one or more of an agent 720, browser 716, and or operating system, programs, and other sources of data 712. For example, a user may enter information, and/or make a selection using user input device 728. Other examples of user input devices 728 include a keyboard, a numeric keypad, a touch screen, a microphone, scanner, and pointing device combined with a screen or other position encoder. Examples of user output devices 732 include a display, a touch screen display, a speaker, a printer, and a tactile feedback component that provides tactile feedback using for example, vibration, heat, electrical, or any other type of feedback. The agent 720, browser 716, operating system 712, user output 732, communication interface 724, user input 728, memory 708, and processor 704 may communicate with one another utilizing a bus 736.

Figure 8:
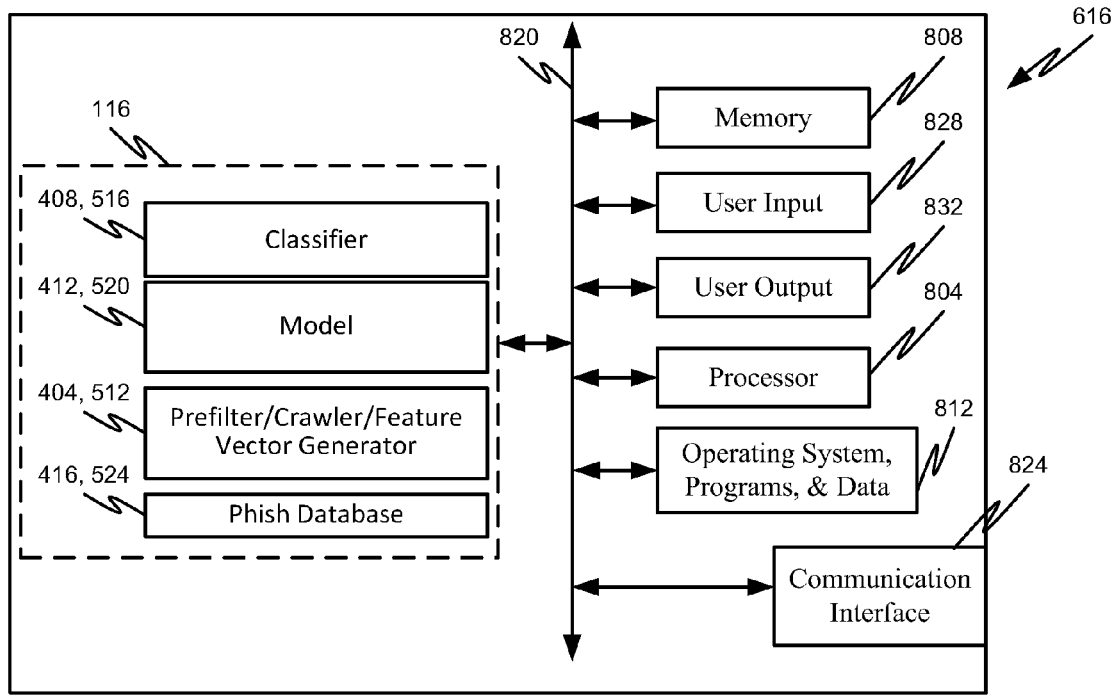
FIG. 8 depicts a block diagram depicting components of a server/device that are utilized in accordance with embodiments of the present disclosure.

FIG. 8 illustrates a block diagram depicting one or more components of a server/device 616. The server/device 616 may include a processor/controller 804 capable of executing program instructions. The processor/controller 804 may include any general purpose programmable processor or controller for executing application programming. Alternatively, or in addition, the processor/controller 804 may comprise an application specific integrated circuit (ASIC). The processor/controller 804 generally functions to execute programming code that implements various functions performed by the server/device 616 in accordance with at least some embodiments of the present disclosure.

The server/device 616 may additionally include memory 808. The memory 808 may be used in connection with the execution of programming instructions by the processor/controller 804, and for the temporary or long term storage of data and/or program instructions. For example, the processor/controller 804, in conjunction with the memory 808 of the server/device 616, may implement one or more operating systems 812.

The memory 808 of the server/device 616 may comprise solid state memory that is resident, removable and/or remote in nature, such as DRAM and SDRAM. Moreover, the memory 808 may comprise a plurality of discrete components of different types and/or a plurality of logical partitions. In accordance with still other embodiments, the memory 808 comprises a non-transitory computer readable storage medium. Such a medium may take many forms, including but not limited to non-volatile media, volatile media, and transmission media.

The memory 808 of the server/device 616 may further be operable to store configuration logs, captured files, URL data. HTML content, and/or IP address information. Specifically, the server/device 616 may include one or more communication interfaces 824 for receiving HTML content, application information, data, and/or other information of an electronic kind and/or for communicating with communication network 612. The server/device 616 may further include user input devices 828 and user output devices 832 to be used in connection with receiving and providing information to one or more operating system, programs, and other sources of data 812. For example, a user may enter information, and/or make a selection using user input device 828. Other examples of user input devices 828 include a keyboard, a numeric keypad, a touch screen, a microphone, scanner, and pointing device combined with a screen or other position encoder. Examples of user output devices 832 include a display, a touch screen display, a speaker, a printer, and a tactile feedback component that provides tactile feedback using for example, vibration, heat, electrical, or any other type of feedback.

The server/device 616 may further include one or more phishing classification models 116. The one or more phishing classification models 116 may be implemented in hardware and/or programming code that implements various functions performed by the one or more phishing classification models 116. For example, the server/device 616 may include the phishing classification model 116 including the classifier 408, 516, one or more models 412, 520, one or more prefilter/crawler/feature vector generators 402, 512, and one or more phish databases 416, 524. The operating system 812, user output 832, communication interface 824, user input 828, memory 808, processor 804, and one or more phishing classification models 116 may communicate with one another utilizing a bus 820.

Although illustrated as including one or more phishing classification models 116, it should be understood that each phishing classification model 116 may reside within its own server/device 616. Additionally, components of one or more phishing classification models 116, such as the classifier 408, 516, one or more models 412, 520, one or more prefilter/crawler/feature vector generators 404, 412, one or more phish databases 416, 524 may be distributed across one or more server/device 616. That is, each component may comprise a distributed system and each phishing classification model 116 may be a distributed system. For example, the phishing classification model 116 may reside on or otherwise be implemented by one or more server/devices 616, endpoints 604, and proxy 608. Alternatively, or in addition, one or more components of the phishing classification model 116 may reside in the cloud and/or provide functionality via one or more communication networks 612. As one example, a classifier 408, 516 may be at a different physical location than the model 412, 520.

Figure 9:
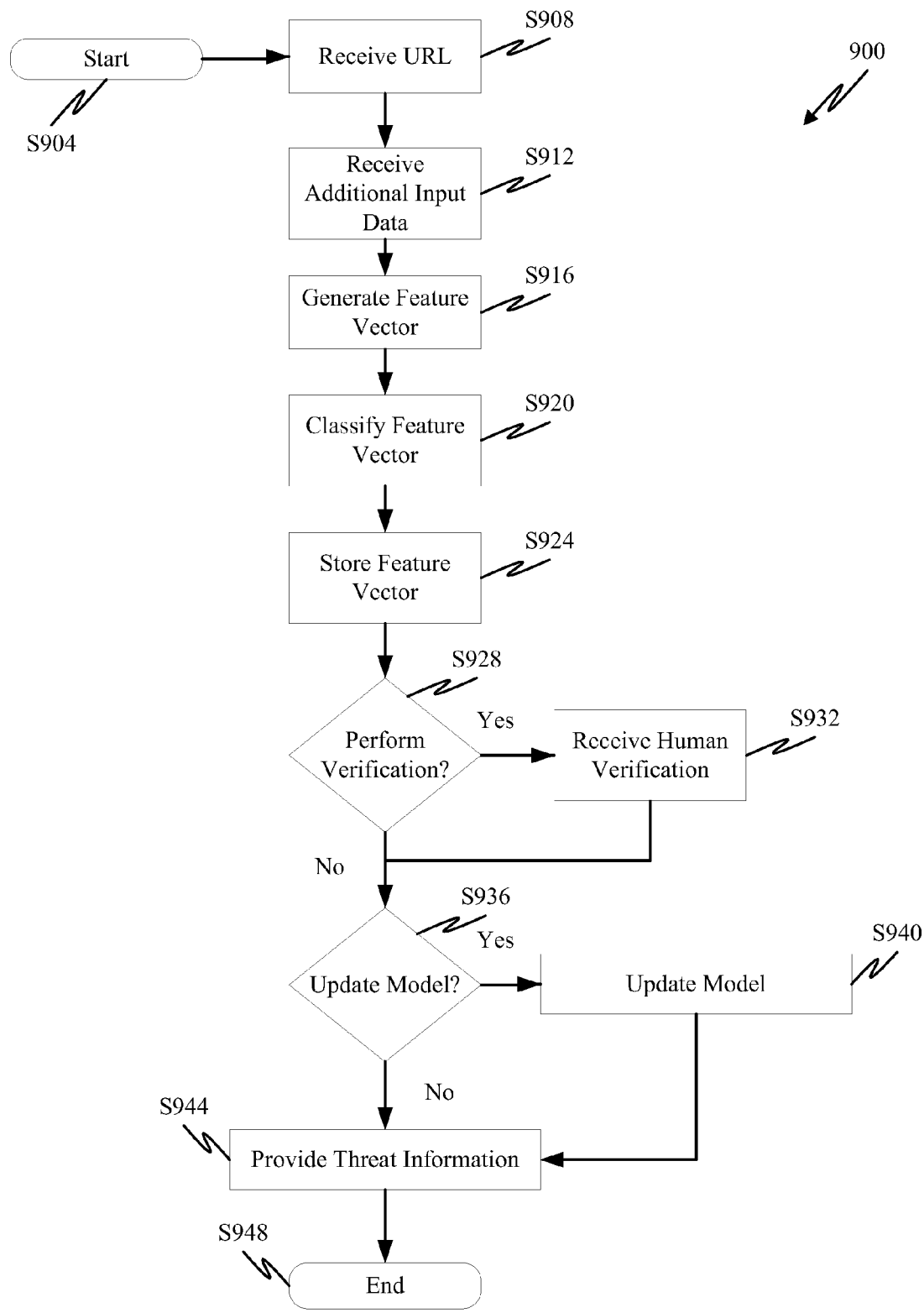
FIG. 9 depicts a flowchart showing the operation of an example of a method in accordance with embodiments of the present disclosure.

Referring now to FIG. 9, a method 900 of providing a phishing classification score for a webpage and/or website will be discussed in accordance with embodiments of the present disclosure. Method 900 is in embodiments, performed by a device, such as the server/device 616 and/or endpoint 604. More specifically, one or more hardware and software components may be involved in performing method 900. In one embodiment, one or more of the previously described modules and/or devices perform one or more of the steps of method 900. The method 900 may be executed as a set of computer-executable instructions executed by a computer system or server/device 616 and/or endpoint 604 and encoded or stored on a computer-readable medium. Moreover, the method 900 may be performed by a combination of server/device 616 and/or endpoint 604. Hereinafter, the method 900 shall be explained with reference to systems, components, modules, software, etc. described with FIGS. 1-8.

Method 900 may continuously flow in a loop, flow according to a timed event, or flow according to a change in an operating or status parameter. Method 900 is initiated at step S904 where a server/device 616 may receive an indication that an instance of a webpage may need to be classified. At step S908, a URL may be received from one or more of a server/device 616 and/or an endpoint 604. Method 900 then proceeds to step S912 where additional information may be provided. Such information may correspond to input 102 and may include, but is not limited to, one or more IP addresses 104, one or more uniform resource locators (URLs) 106, HTML content 108, geo-location information 110, ISP data 112, and who-is data 114 and may be provided by one or more crawlers. Method 900 then proceeds to step S916 where a Feature Vector is generated for the instance of the webpage. Method 900 then proceeds to step S920 where the generated feature vector may be classified by one or more classification models. For example, the one or more classification models may include a model 412, 520 for classifying phishing websites. In one instance, a binary classification model for detecting phishing websites may be used to determine if the generated feature vectors appear to be associated with one or more phishing websites. As one example, the one or more classifiers 408, 516 relying on one or more models 412, 520 may determine a probability that a webpage associated with one or more URLs is a phishing site. This determined probability is generally normalized resulting in a classification score for the one or more URLs, where the classification score generally represents a measure of the likelihood that the URL is or otherwise is associated with a phishing site. Once the feature vector has been classified which may include an associated phishing score, the method 900 proceeds to step S924 where the result of the classification and the feature vector are stored. For example, the classification score and the feature vector may be stored in a phish database 416, 524.

Next, method 900 proceeds to step S928 where it is determined whether or not verification should be performed. For example, one or more URLs associated with a website may be passed to 420, 528 for human verification such that one or more researches may determine and correctly label a URL as a phishing website or a non-phishing website. In some instances, the URLs passed are selected at random, in other instances, the URLs that are passed may be flagged based on a classification score and/or a because of a particular feature in a feature vector is present. If verification is to be performed, the method 900 then proceeds to step S932 where a researcher may provide, and thus the method may receive, verification information concerning the classification and the feature vector. For example, the researcher may label one or more URLs and/or feature vectors as being associated with a phishing webpage and/or website. Once the verification process has been completed and/or the verification was not performed, the method 900 then proceeds to step S936 where it is determined whether or not the classification model is to be updated. If, at step 936, the classification model is to be updated, the method 900 proceeds to step S940 where the classification model is updated. For example, as the researchers work through the review priority lists and assign new threat assessments, the phishing classification model 116 may update the model 412, 520, the phishing classification scores for all instances, and the review priority lists. The updates may be processed by a distributed highly scalable system to ensure that any updates are available to the researchers within seconds to their provided input. As one example, at 420, the site associated with the URL may be verified such that sites associated with false positives and/or false negatives may be utilized to retrain one or more classifiers and/or models 412, 520 at 424, 532 such that the model is updated. An updated model 412, 520 may then be provided as a retrained binary classification model.

After updating the classification model, or if the classification model is not to be updated, method 900 then proceeds to step S944 where the classification result (i.e. classification score) is provided to an entity, such as an endpoint 604, server/device 616, third party, and/or register (black/white list). Method 900 then ends at step S948.

Figure 10:
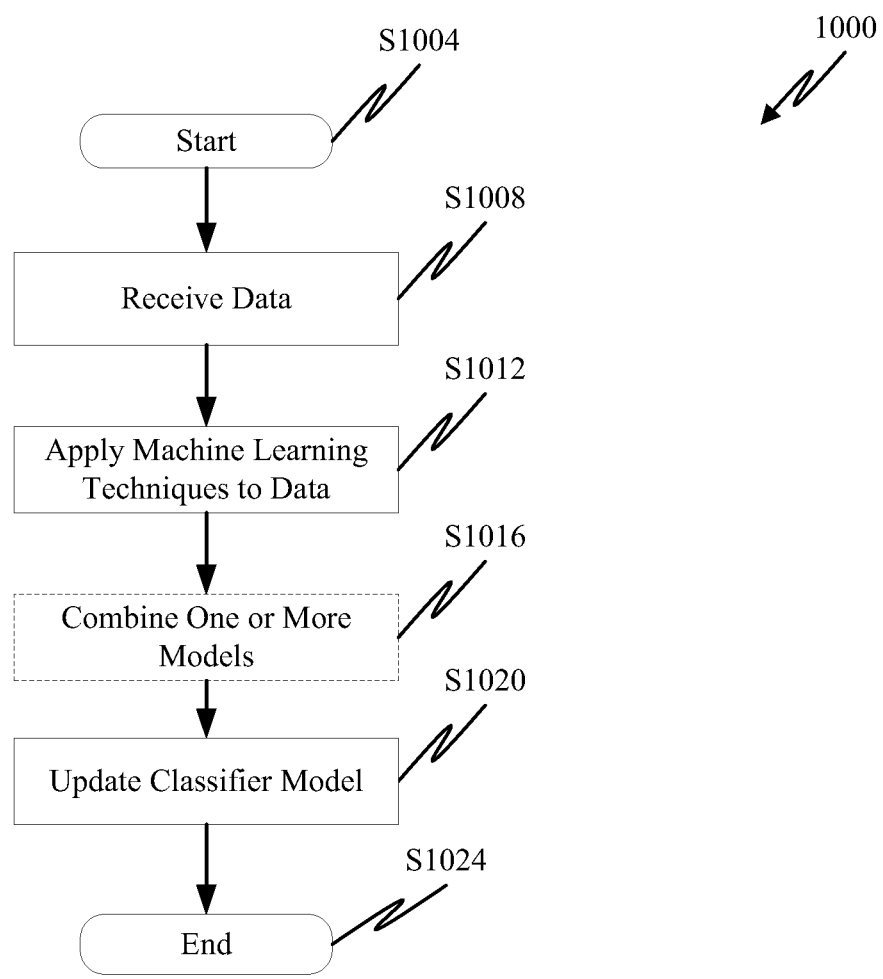
FIG. 10 depicts a flowchart showing the operation of an example of a method in accordance with embodiments of the present disclosure.

Referring now to FIG. 10, a method 1000 of updating a classification model 412, 520 is provided in accordance with embodiments of the present disclosure. Method 1000 is in embodiments, performed by a device, such as the server/device 616 and/or endpoint 604. More specifically, one or more hardware and software components may be involved in performing method 1000. In one embodiment, one or more of the previously described modules and/or devices perform one or more of the steps of method 1000. The method 1000 may be executed as a set of computer-executable instructions executed by an endpoint 604 and/or computer/server 616 and encoded or stored on a computer-readable medium. Moreover, the method 1000 may be performed by a combination of server/device 616 and/or endpoint 604. Hereinafter, the method 1000 shall be explained with reference to systems, components, modules, software, etc. described with FIGS. 1-9.

Method 1000 may continuously flow in a loop, flow according to a timed event, or flow according to a change in an operating or status parameter. Method 1000 is initiated at step S1004 where a server/device 616 may receive an indication that a classification model 412, 520 may need to be updated. For instance, an indication to update a classification model may be provided by S940. That is, steps 940 may implement method 1000 in whole or in part to update a classification model 412, 520. Method 1000 proceeds from step S1004 to step S1008 where data is received. For example, the data received may correspond to data associated with a previous classification model, training session or the like. In one instance, the data may contain instances with assigned phishing classification scores—obtained through the researcher, instances without assigned classification scores, as well as various feature vector representations of the instances.

Method 1000 may then apply one or more Machine Learning techniques to the data at step S1012. For example, the Machine Learning techniques employed by the system include, but are not limited to, Support Vector Machines (SVM), Maximum Entropy Discrimination (MED), boosted regression/classification trees, feed forward neural networks (FNN), and deep believe networks (DBN). Furthermore, transductive learning methods may be applied to leverage the information contained in the stored instances with unknown phishing classification assessments, and, thus further improve the prediction accuracy of the learned phishing classification models. In instances where one or modes 412, 520 are used, method 1000 may then combine the one or more models at optional step S1016. The combination of models allows the method to make accurate and robust phishing classification assessments given incomplete input data. For example, an URL may have incomplete information at its first observation by the phishing classification system 100 to accurately determine its phishing classification score. In such an instance, the system 100 may utilize the information that it has, for example, information on the IP address and some HTML content through which the URL was obtained, to compensate for the lack of information when determining an approximation of a phishing classification score. As more information like geo-location and web-page content classification information for the URL becomes available, the feature vectors of the URL in question may be dynamically updated and, accordingly, the URL's phishing classification score may be dynamically updated as well. At step S1020, the classification model may then be updated based on the Machine Learning techniques and/or the combination of one or more models 412, 520. At step S1024, the method 1000 may end.

Figure 11:
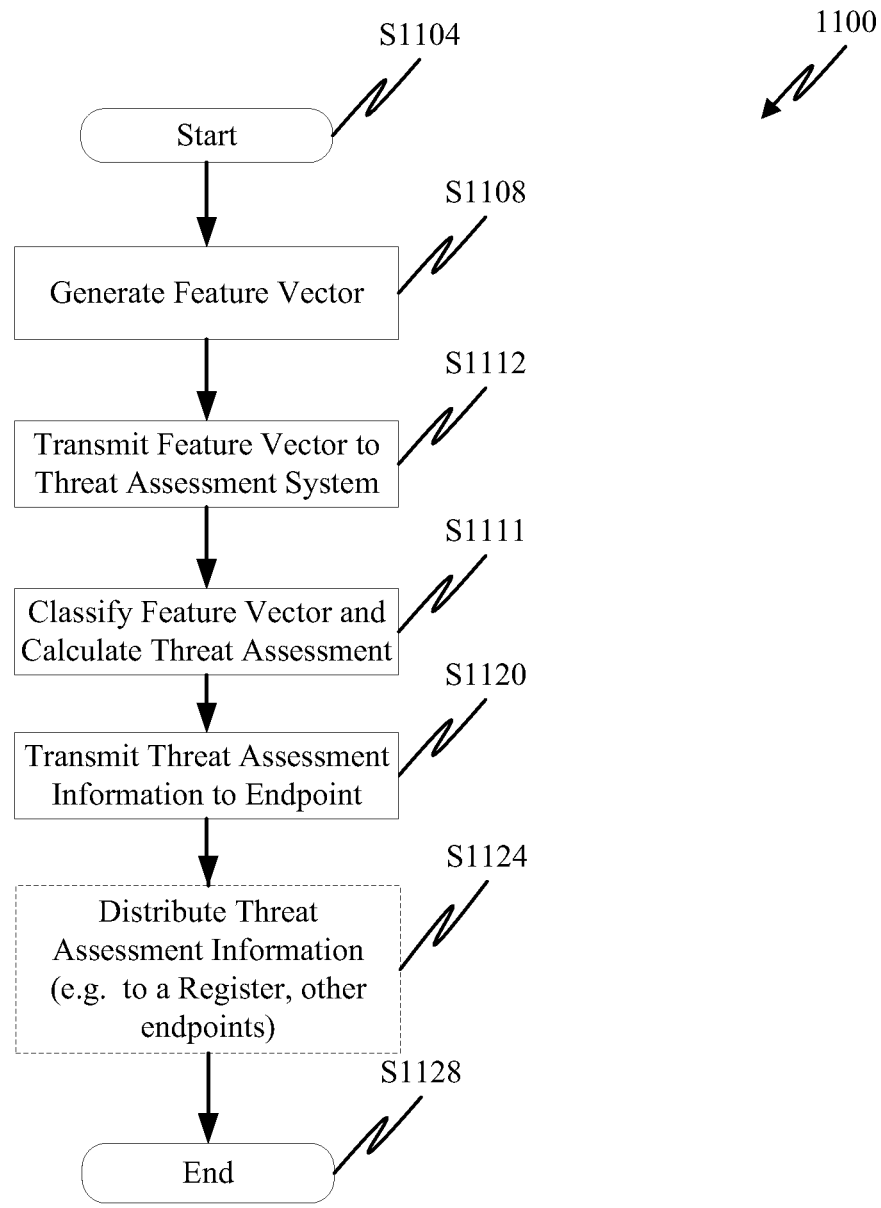
FIG. 11 depicts a flowchart showing the operation of an example of a method in accordance with embodiments of the present disclosure.
Figure 12:
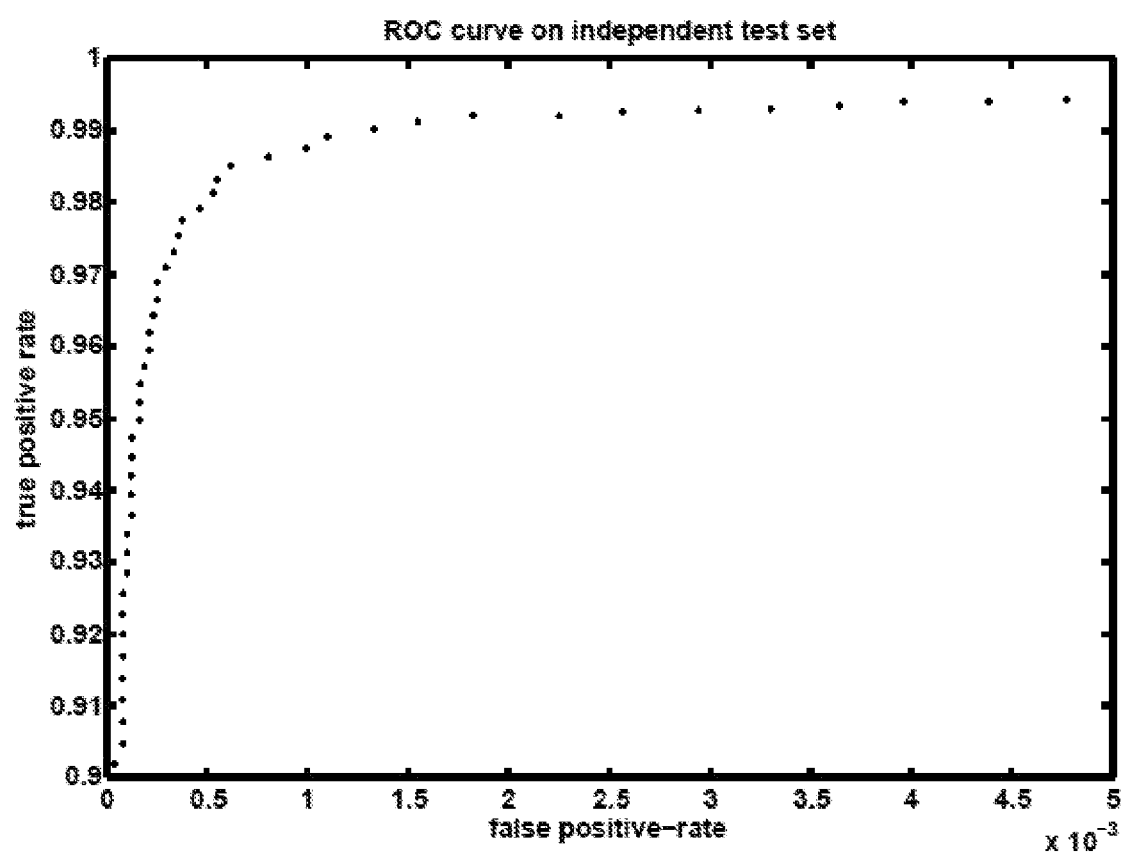
FIG. 12 depicts a Receiver Operating Characteristic (ROC) in accordance with some embodiments of the present disclosure.

Referring now to FIG. 11, a method 1100 of providing phishing classification scores based on one or more feature vectors is provided in accordance with embodiments of the present disclosure. Method 1100 is in embodiments, performed by a device, such as the server/device 616 and/or endpoint 604. More specifically, one or more hardware and software components may be involved in performing method 1100. In one embodiment, one or more of the previously described modules and/or devices perform one or more of the steps of method 1100. The method 1100 may be executed as a set of computer-executable instructions executed by a computer system or server/device 616 and/or endpoint 604 and encoded or stored on a computer-readable medium. Moreover, the method 1100 may be performed by a combination of server/device 616 and/or endpoint 604. Hereinafter, the method 1100 shall be explained with reference to systems, components, modules, software, etc. described with FIGS. 1-10.

Method 1100 may continuously flow in a loop, flow according to a timed event, or flow according to a change in an operating or status parameter. Method 1100 is initiated at step S104. In initially, an endpoint 604 may receive or otherwise have access to an web page and/or website that is to be classified. Method 1100 then proceeds to step 1108 where a feature vector of the webpage and/or website instance is generated at the endpoint 604. For example, the feature vector may be generated by an agent/client 720, 508 residing or otherwise operating on the endpoint 604. The generated feature vector is then transmitted to a phishing classification system, such as a phishing classification system 100 that may reside on or is otherwise associated with server/device 616. At step S1116, the threat assessment system 100 may classify the received feature vector according to one or more models 520 and calculate a phishing classification score. Next, at step S1120, a calculated phishing score is transmitted to the endpoint 604. As one example, the agent and/or client 720 associated with the endpoint 604 may receive the phishing classification score. Method 1100 then proceeds to optional step S1124 where a phishing classification system 100 may distribute and/or disseminate the phishing classifications score to a register and/or other endpoint 604. Method 1100 then ends at step S1128.

It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor (GPU or CPU) or logic circuits programmed with the instructions to perform the methods (FPGA). These machine-executable instructions may be stored on one or more machine readable mediums, such as CD-ROMs or other type of optical disks, floppy diskettes, ROMs, RAMs, EPROMs. EEPROMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc.

When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. A computer-implemented method comprising:
    using a device, creating one or more feature vectors for a landing page of a website, wherein the one or more feature vectors for the landing page are derived from one or more landing page elements;
    creating one or more feature vectors for one or more child pages that are a descendant of the landing page;
    deriving a final feature vector from the one or more feature vectors of the landing page and the one or more feature vectors for the child pages; and
    providing the final feature vector to a model to determine whether the website is a phishing website.

2. The method of claim 1, further comprising:
    inputting the final feature vector into a model, wherein the model outputs a score associated with a probability of being a phishing site given the input; and
    classifying the website as a phishing website based on the determined score.

3. The method of claim 2, further comprising:
    classifying the website as a phishing website given the score and a threshold.

4. The method of claim 2, wherein the final feature vector includes
    a concatenation of at least some of the following individual feature vectors:
    a uniform resource locator (URL) feature vector including at least some of a URL string character n-gram, an IP address character n-gram, and URL geo-location information;
    an average URL feature vector derived from links and hrefs on page;
    average URL feature vectors derived from links and hrefs on page in bins of similarity to the page URL feature vector;
    an html content feature vector;
    a classification service classification result feature vector; and
    a feature vector based on age of webpage.

5. The method of claim 2, wherein the model utilizes active learning to compute a priority in which the feature vector should be labeled.

6. The method of claim 2, wherein the model utilizes one or more labels to identify whether the website is a phishing website or not a phishing website.

7. The method of claim 2, wherein the model utilizes transductive learning.

8. The method of claim 2, further comprising:
    an output score indicating an entity that is targeted by the phishing website.

9. The method of claim 1, wherein the feature vector is derived according to the following formula:

$$\vec{p} = \begin{pmatrix} \vec{p}_{00}, \frac{1}{n_1}\sum_{k}^{n_1} \vec{p}_{1k}, \frac{1}{n_{11}}\sum_{\{k|k \in bin_{11}\}}^{n_{11}} \vec{p}_{1k}, \ldots, \frac{1}{n_{1m}}\sum_{\{k|k \in bin_{1m}\}}^{n_{1m}} \vec{p}_{1k}, \\ \vdots \\ , \frac{1}{n_l}\sum_{k}^{n_l} \vec{p}_{lk}, \frac{1}{n_{l1}}\sum_{\{k|k \in bin_{l1}\}}^{n_{l1}} \vec{p}_{lk}, \ldots, \frac{1}{n_{lm}}\sum_{\{k|k \in bin_{lm}\}}^{n_{lm}} \vec{p}_{lk} \end{pmatrix}.$$

10. The method of claim 1, further comprising:
    updating one or more classifiers based upon the final feature vector.

11. The method of claim 1, further comprising:
    receiving input from a researcher indicating that the final feature vector should be classified as a phishing website.

12. The method of claim 1, wherein the one or more child pages are iframe pages.

13. A system for classifying one or more websites as a phishing website, the system comprising:
    a plurality of sensors for providing input data to a server configured to:
    create one or more feature vectors for a landing page of a website, wherein the one or more feature vectors for the landing page are derived from one or more landing page elements;
    create one or more feature vectors for one or more child pages that are a descendant of the landing page;
    derive a final feature vector from the one or more feature vectors of the landing page and the one or more feature vectors for the child pages; and
    provide the final feature vector to a model to determine whether the website is a phishing website.

14. The system of claim 13, wherein the server is further configured to input the final feature vector to a model, wherein the model outputs a score associated with a probability of being a phishing site given the input, and classifies the website as a phishing website based on the determined score.

15. The system of claim 13, wherein the page feature vectors include a concatenation of at least some of the following individual feature vectors:
    a uniform resource locator (URL) feature vector including at least some of a URL string character n-gram, an IP address character n-gram, and URL geo-location information;
    an average URL feature vector derived from links and hrefs on page;
    average URL feature vectors derived from links and hrefs on page in bins of similarity to the page URL feature vector;
    an html content feature vector:
    a classification service classification result feature vector; and
    a feature vector based on age of webpage.

16. The system of claim 13, wherein the server is further configured to update one or more classifiers based upon the final feature vector.

17. The system of claim 13, wherein the server is further configured to receive input from a researcher indicating that the final feature vector should be classified as a phishing website.

18. The system of claim 13, wherein the one or more child pages are iframe pages.

19. A non-transitory computer-readable medium comprising processor-executable instructions that are executable by a processor to facilitate the classification of one or more websites, the instructions comprising:
   creating one or more feature vectors for a landing page of a website, wherein the one or more feature vectors for the landing page are derived from one or more landing page elements;
   creating one or more feature vectors for one or more child pages that are a descendant of the landing page;
   deriving a final feature vector from the one or more feature vectors of the landing page and the one or more feature vectors for the child pages; and
   providing the final feature vector to a model to determine whether the website is a phishing website.

20. The non-transitory computer readable medium of claim 19, wherein the one or more child pages are iframe pages.

* * * * *